United States Patent

[11] 3,582,886

[72] Inventors William Hardin
Stewartville;
Patrick J. Traglia, Rochester, both of, Minn.

[21] Appl. No. 672,550
[22] Filed Oct. 3, 1967
[45] Patented June 1, 1971

[73] Assignee International Business Machines Corporation
Armonk, N.Y.

[54] SCANNING ADDRESS GENERATOR FOR COMPUTER-CONTROLLED CHARACTER READER
9 Claims, 5 Drawing Figs.

[52] U.S. Cl. 340/146.3, 178/7.8
[51] Int. Cl. G06k 9/04
[50] Field of Search 235/61.7, 61.11, 61.115 CRT; 340/146.3, 324.1, 146.2; 178/6.8, 6 IND, 69.5, 7.5 SE, 69.5 F, 6; 315/19

[56] References Cited

UNITED STATES PATENTS

| | | | |
|---|---|---|---|
| 3,274,550 | 9/1966 | Klein | 340/146.3 |
| 3,321,575 | 5/1967 | Lewczyk | 178/6 |
| 3,346,853 | 10/1967 | Koster et al. | 340/172.5 |
| 3,458,688 | 7/1969 | Garry et al. | 235/61.7 |

*Primary Examiner*—Maynard R. Wilbur
*Assistant Examiner*—William W. Cochran
*Attorneys*—Hanifin and Jancin and Homer L. Knearl

ABSTRACT: Great versatility can be achieved by using a computer to control the scanning format of a character reader. To control the format the computer must have accurate addresses as to where to send the scanning beam in the character reader to scan the character fields on a document to be read.

To obtain the accurate addresses, the apparatus in FIG. 1 is built into the character reader. An operator observes on a display cathode-ray tube a facsimile of the document and an address mark showing the position of a scan address. The facsimile is produced by a scanning cathode-ray tube which scans the document to be read. The operator may move the address mark relative to the displayed information from the document by manually adjusting potentiometer. The scanning addresses for the scanning cathode-ray tube and the display cathode-ray tube are identical as they are driven by common deflection circuits. Once the operator observes that the desired address is positioned next to the information he wishes to address, he actuates a format address indicate mode of operation. The format address indicate operation uses digitzers to convert the analog signal from the potentiometers into a digital address signal. The digitizers arrive at the digital address by consecutively approximating in smaller and smaller increments the analog address from the potentiometer. Once the digital address is determined, it is displayed by lamps which the operator observes. The operator then causes the computer to store the digital address which he has observed. Thereafter the computer may cause the scanning beam to move to that address whenever it wishes to read the characters at that address.

INVENTORS
WILLIAM W. HARDIN
PATRICK J. TRAGLIA

BY Homer L. Knearl
AGENT

SCANNING ADDRESS GENERATOR FOR COMPUTER-CONTROLLED CHARACTER READER

BACKGROUND OF THE INVENTION

This invention relates to apparatus for generating very accurate scanning beam addresses for use by a computer controlling a character reader.

Recently, in the character recognition technology great interest has arisen in having a character recognition system with a great deal of versatility. Previously character recognition systems have largely been limited to reading a fixed format type of document and journal tapes. At present, however, recognition machines are being developed which will have the ability to vary the format by which a document is scanned for recognition. For example, in a sales transaction document it may be desirable to first read the store name in one portion of the document and then read the customer's identification in another portion of the document, then read the item purchased followed by the quantity and price and total cost.

All of these data elements have various lengths and are usually printed in definite areas of a sales transaction document. If a scanner for a character reader scans the whole document line by line, obviously a lot of wasted scanning time is involved. Accordingly, the expedient thing is to scan only those areas of the sales document which obtain characters to be read. To do this requires addressing the scanning beam to these particular areas rather than scanning the whole document line by line.

Of course, it is possible to build a character reader which will have a fixed scan pattern associated with a fixed format document. This destroys the versatility of such a character reader since the character reader will only be able to handle those documents which have the predetermined format. Accordingly, it is desirable to have a character recognition system which can handle documents of various formats and yet have a scanning pattern which can be rapidly addressed to character fields in each format.

Versatility can be achieved by using a computer to store addresses for the scanning beam of the character reader. Then to change the format of documents one need only change the addresses stored in the computer. The computer thus controls the character reader's scanning pattern by supplying addresses to the scanning beam in the character reader. The problem involved is how to accurately determine the addresses to be stored in the computer for use by the character reader.

It is not practical to merely define a scanning grid and then apply the linear deflection voltages to reach a position on the grid. The reason is that in character recognition, the positioning must be very accurate, and the deflection hardware and drive circuitry in the character reader scanner contains inherent characteristics which prevent linearly programming the scanner to reach a position on the grid. In the character recognition of documents, the scan address positions must be accurate to within a few thousandths of an inch. If they are not, the scan patterns used to recognize characters at the address will not be properly positioned to accomplish the recognition. Linearly addressing the deflection signals in a cathode-ray tube scanner will not give this accurate positioning without adding expensive circuitry to the deflection circuits to correct for such factors as pincushion correction and variations in scanning beam velocity. For these reasons it is impractical to set up an address grid in the scanning area and linearly program the deflection signals to an address in the grid.

It is an object of this invention to obtain addresses in the scanning area which are accurate within a few thousandths of an inch, these addresses being characteristic of the character recognition system in which they will be used.

It is another object of the invention to accurately determine addresses in a character reader scanner by varying the analog address until it is at the proper address position and thereafter digitizing this analog address so that it may be stored in a computer for later usage by the character reader.

PRINCIPLE OF THE INVENTION

The above objects are accomplished by displaying to an operator the scan position of a data field from a document to be read and the position of a scanning address mark. The operator may adjust this scanning address mark until he has the address mark positioned next to the scan position of the data field to be read. Thereupon the operator initiates a format address indicate operation in which the address he has set up for the mark displayed to him in digital language. This digital address may then be stored in the computer for later usage by the character reader when it is desired to direct the scanning beam to that address to read the data field next to the address.

In addition, the format address indicate mode is followed by a data display mode in which the data addressed is displayed in detail to the operator. The operator may then adjust the scan address to bring it closer to the data field. In other words, the operator may first adjust the scanning address mark to an approximate position near the data to be scanned. Thereafter, he obtains a more detailed display of the data he wishes to scan and the addresses from which the scanning of data is accomplished. With this detailed display of relative position of scan address to the data, the operator may then again adjust his addressing of the scanner so as to very accurately position the scanner next to the data. After this fine adjustment the operator observes the digital address and passes it to the computer.

The great advantage of the invention is that the scanning addresses are accurately determined by manually adjusting the scanner in the character reader to the specific address desired and then reading out that address. This eliminates any necessity for correction factors to be applied to the deflection circuits. In other words, the specific address which will be determined by this invention is not a linear address associated with a scan grid but is instead an empirically determined address which will always position the scanner in the character reader with which it is associated to the same position each time the computer supplies that address to the character reader. The foregoing and other objects, features and advantages of the invention will be apparent from the following more particular description of a preferred embodiment of the invention as illustrated in the accompanying drawings.

DESCRIPTION

Figure 1:
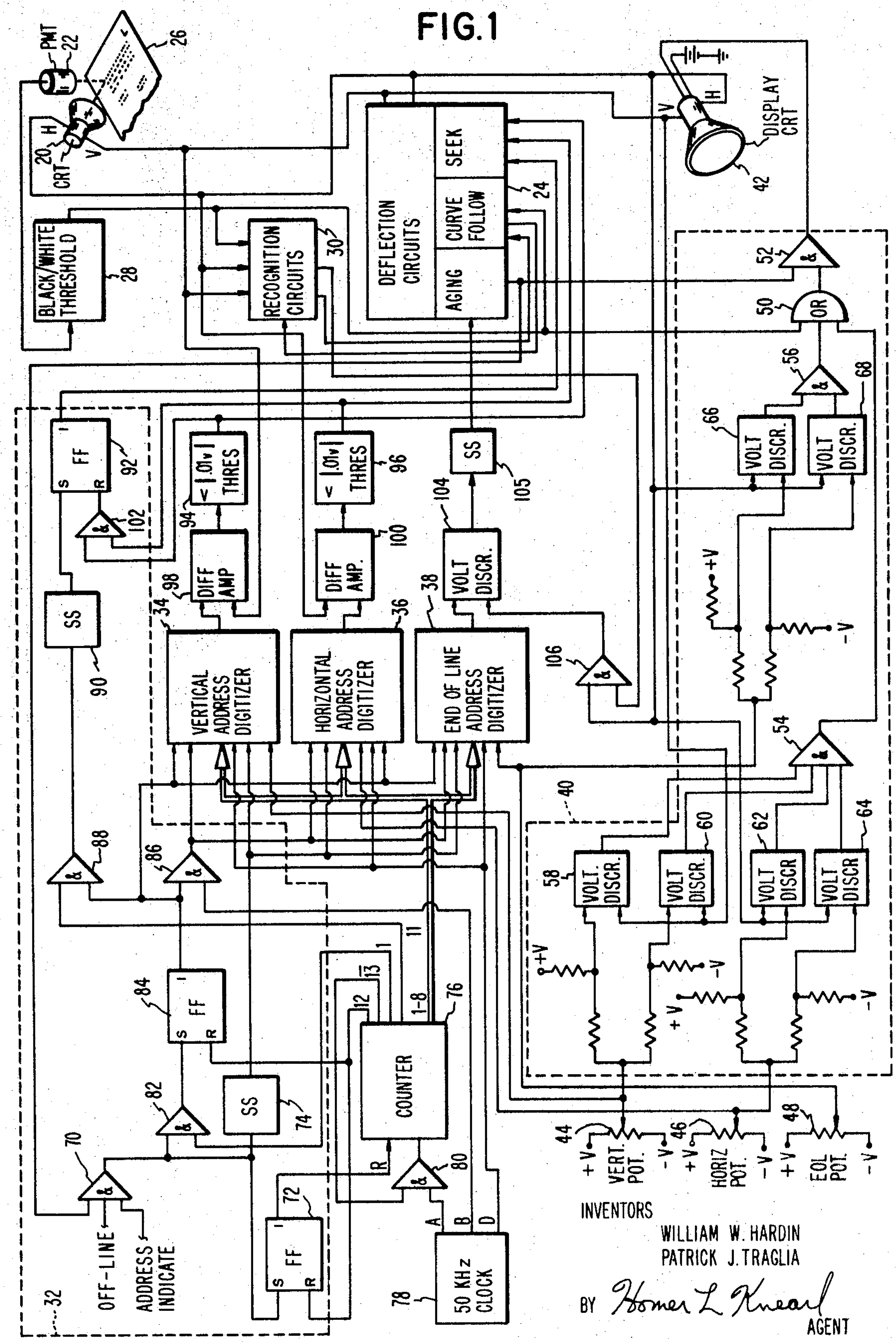
FIG. 1 shows a block diagram of the preferred embodiment of the invention.

In FIG. 1 the preferred embodiment of the invention is shown with well-known types of character recognition hardware which do not form a part of the invention. This hardware consists of the scanning mechanism made up of cathode-ray tube 20 and photomultiplier tube 22. The cathode-ray tube scanning is controlled by the deflection circuits 24 which operate in three different modes to be discussed shortly. The beam from the cathode-ray tube 20 strikes the document 26 which is being scanned. Reflected light from the document 26 is picked up by the photomultiplier tube 22. The amount of reflected signal picked up by photomultiplier tube 22 is converted into a binary signal by the black-white threshold 28. Generally, if the reflected light picked up by photomultiplier tube 22 is below a given threshold, the threshold circuit 28 indicates black has been scanned. Of course, if the video signal from the photomultiplier tube 22 is above the threshold, the threshold indicates white has been scanned. The digitized black-white signal is passed to the recognition circuits 30. The recognition circuits also receive the horizontal and vertical deflection signals and curve follow operative signal. Knowing (1) recognition scanning is in process, (2) the position of the scanning beam and (3) the black or white condition at that position, the recognition circuits then make a decision as to the character scanned by the cathode-ray tube 20. Many recognition systems could be used; however, one example would be the curve following or contour analysis system taught in commonly assigned U.S. Pat. No. 3,303,465.

Referring again to the deflection circuits 24, the circuits are shown as having three modes of operation—aging, curve follow and seek. In the aging mode of operation the deflection circuits would direct the cathode-ray beam in tube 20 much like a television scanner. The scanning path is a series of horizontal lines until the whole surface of the cathode-ray tube has been scanned. The purpose of the aging mode of operation is to give equal scanning time to every portion of the phosphor on the cathode-ray tube face. In this manner when there is no meaningful scanning, the phosphor over the entire face of the cathode-ray tube 20 will be aged at the same rate.

The seek mode of operation of the deflection circuits 24 follows the aging mode of operation and is triggered by an outside input signal to be described. During the seek mode, the deflection circuits are excited with a signal horizontal and a single vertical ramp voltage until the cathode-ray tube beam reaches a position to which it is directed. The fact that the destination has been reached is supplied to the deflection circuits by outside signals to be described. When the destination has been reached, the seek mode terminates and the curve follow mode of operation in the deflection circuits begins.

The curve follow operation for purposes of contour analysis of characters is taught in commonly assigned U.S. Pat. No. 3,229,100 and commonly assigned Pat. application, Ser No. 534,178, filed Mar. 14, 1966. The curve follow operation causes the scanning beam to move horizontally until it strikes a character. The recognition circuits then tell the deflection circuits to follow the outside contour of the character until the character is recognized by the recognition circuits 30 or rejected. The curve follow operation proceeds horizontally across the document until the end of a line of characters is detected. This end of line signal to be described is passed to the deflection circuits and initiates the aging mode in the deflection circuits.

As pointed out in the introduction, the purpose of the invention is to obtain accurate addresses for a character reader which is controlled by a central processing unit. In this way the addresses may be stored in the central processing unit and then sent by the central processing unit to the character reader to control the seek operation in the deflection circuits and end of line detection. The need is for an operator to accurately determine the addresses which the computer is to store and later give to the character reader so as to cause the character reader to scan a given line of characters. The address indicate portion of the hardware in FIG. 1 is made up of an address indicate control 32, address digitizers 34, 36 and 38, intensity control 40, display cathode-ray tube 42 and manually controlled resistance potentiometers 44, 46 and 48. The display cathode-ray tube is driven by the same horizontal and vertical deflection signals applied to the scanning cathode-ray tube 20. In addition, the display cathode-ray tube has an intensity input from the intensity control 40. The intensity control increases the intensity of the cathode-ray beam in the display cathode-ray tube 42 at different times during the aging mode of operation of the deflection circuits. The purpose is to display a facsimile of what the cathode-ray tube 20 is scanning and also to display address positions specified by the potentiometers 44, 46 and 48.

During the aging mode of operation, the digitized video signal from the black-white threshold 28 is passed by OR gate 50 and AND gate 52 to increase the intensity of the display cathode-ray tube 42. The AND gate 52 is enabled by the deflection circuits being in the aging mode of operation. Accordingly, every time the scanner crosses a character, the intensity in the display cathode-ray tube is boosted. In this manner the display cathode-ray tube produces a facsimile of the area of the document 26 being scanned.

The intensity of the display cathode-ray tube 42 is also boosted by signals received from AND gates 54 and 56. The purpose of AND gate 54 is to display a small address mark on the cathode-ray tube 42 indicating the position addressed by the vertical and horizontal potentiometers 44 and 46. The purpose of the AND gate 56 is to display a vertical line on the cathode-ray tube 42 indicating the horizontal end of line barrier addressed by the end of line potentiometer 48.

AND gate 54 receives input signals from voltage discriminators 58, 60, 62 and 64. Voltage discriminators 58 and 60 have an output when the vertical deflection signal is within a small given voltage of the voltage set on the vertical potentiometer 44. Likewise voltage discriminators 62 and 64 have an output when the horizontal deflection signal is within a small predetermined voltage of the voltage set on the horizontal potentiometer 46. Since AND gate 54 combines these two horizontal and vertical bracketing conditions, AND gate 54 has an output when the scanning beam is in a small square centered at the address specified in the vertical and horizontal potentiometers 44 and 46. Accordingly, the output from AND gate 54 passes through OR gate 50 and AND gate 52 to produce the address mark on the display cathode-ray tube 42.

The AND gate 56 receives its inputs from voltage discriminators 66 and 68. These voltage discriminators have an output when the horizontal deflection signal is within a small voltage of the voltage set on the end of line (EOL) potentiometer 48. Accordingly, AND gate 56 causes the display cathode-ray tube 42 to intensify each time the cathode-ray beam crosses the end of line address specified by the potentiometer 48.

In operation during the aging mode, an operator can observe the display cathode-ray tube 42 and see the area of the document 26 being scanned. In addition, the operator may adjust the vertical and horizontal potentiometers 44 and 46 to bring the address mark square to a desired address at the start of one of the lines displayed from the document 26. In addition, the operator may observe a vertical line indicating the end of horizontal line address and vary this address by adjusting the end of line potentiometer 48. When the operator has adjusted the potentiometers 44, 46 and 48 to the addresses desired, as shown in the display cathode-ray tube 42, he then can actuate the address indicate control 32 to determine what the digital address is.

The address control 32 is initiated by three signals—aging mode signal received from the deflection circuits 24, an off line signal indicating the central processing unit is not presently controlling the character reader and an address indicate signal keyed by the operator. These three signals when applied to AND gate 70 initiate the address indicate operation. The output from AND gate 70 sets flip-flop 72 and fires singleshot 74. Flip-flop 72 resets the counter 76 to zero. The output from singleshot 74 resets the digitizers 34, 36 and 38.

Figure 3:
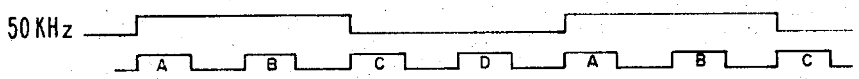
FIG. 3 shows the clock signals generated by the 50 kHz. clock in FIG. 1.

The count signals from counter 76 are used throughout the digitizers and the address indicate control 32. Counter 76 is driven by the 50 kHz., clock 78. The clock signals A, B and D are shown in FIG. 3. Each clock signal A, B and D occurs at the rate of 50 kHz. but each occurs at a different phase of the basic 50 kHz. signal. As can be seen, they follow sequentially with A first, B second and D last and then a new cycle of A, B and D last. Each A signal causes the counter 76 to advance one count when the AND gate 80 is enabled. AND gate 80 is enabled by a $\overline{13}$ (not 13) count from counter 76. Accordingly, when the counter is reset, it will be counted up to count 13 and then AND gate 80 inhibits further clock signals A from advancing the counter.

To enable the address digitizers 34, 36 and 38 the one count from the counter enables AND gate 82 to pass the signal from AND gate 70 through to flip-flop 84. Flip-flop 84 being set enables AND gate 86 which passes an enabling pulse to each of the address digitizers 34, 36 and 38 each time the B phase clock signal is generated by the 50 kHz. clock 78.

The function of the address digitizers 34, 36 and 38 is to digitize the analog signals from the potentiometers 44, 46 and 48 respectively, and to indicate the digital addresses so that the operator may cause the central processing unit to store the digital addresses. The hardware in each address digitizer 34, 36 and 38 is identical and shown in FIG. 4. This hardware will be discussed shortly.

Eight counts from the counter 76 are used by the address digitizers to complete the digitalization. At the eleventh count from the counter 76, AND gate 88 which is enabled by flip-flop 84 passes the eleven count to fire singleshot 90. The output from singleshot 90 sets flip-flop 92. The set condition in flip-flop 92 then initiates the seek operation in the deflection circuits 24 previously described. End of seek operation for deflection circuits 24 is detected by monitoring threshold detectors 94 and 96. The threshold detector 94 receives a difference signal from the difference amplifier 98. The difference amplifier takes the difference between the analog value of the vertical address and the vertical deflection signal. When this difference is less than 100th of a volt, the threshold 94 has an output which causes the vertical seek operation to stop. Similarly, the threshold 96 receives its input from the difference amplifier 100. The difference amplifier 100 takes the difference between the horizontal analog address and the horizontal deflection signal. When this difference is less than 100th of a volt, the threshold 96 has an output signal which tells the horizontal seek deflection circuits to stop operation. When both the horizontal and vertical seek operations have stopped, the deflection circuits automatically begin the curve follow mode of operation. Also, this end of seek condition is detected by AND gate 102 which resets the flip-flop 92

The purpose of singleshot 90 is to provide a finite pulse causing a definite setting of the seek operation. If the singleshot 90 were not used, it might happen that the scanning beam was positioned at the address to which it was to seek, and a definite seek and end of seek signal might not occur. This would jeopardize automatic switching into curve following mode at end of seek time.

When the curve following mode of operation is initiated, the cathode-ray tube scanner 20 proceeds to scan for recognition the horizontal line of characters until the horizontal scanning position has moved past the end of line address from the address digitizer 38. Voltage discriminator 104 has an output when this occurs, and this output is converted to a pulse by singleshot 105. The pulse initializes the aging mode in the deflection circuits 24. One additional condition is that if the curve following is presently scanning a character when the end of line address is crossed, the curve follower will continue to scan the character before the aging mode is initiated. This condition is accomplished by AND gate 106 which inhibits the horizontal deflection signals from being passed to the voltage discriminator 104 when the recognition circuits 30 indicate a character is presently being scanned. After the character is scanned, the AND gate 106 passes the horizontal deflection signal to the voltage discriminator 104. The discriminator then indicates the end of line barrier has been crossed.

Figure 4:
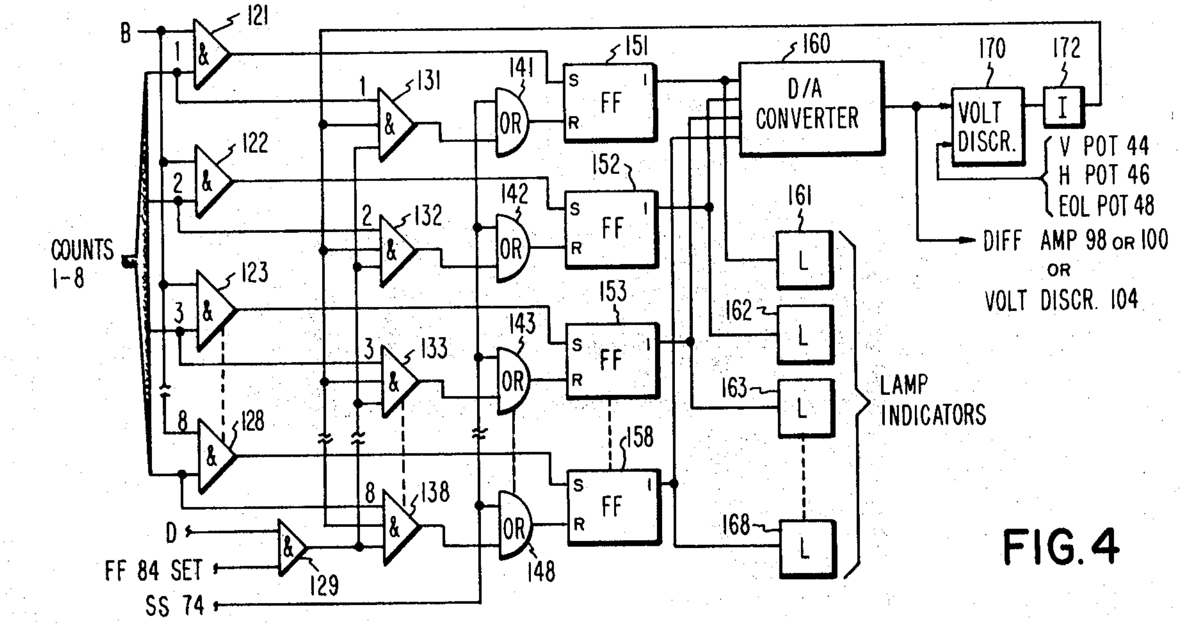
FIG. 4 shows a detail block diagram of the address digitizers in FIG. 1.

Now referring to FIG. 4, a detail block diagram of an address digitizer is shown. The digitizer receives the B clock pulse from AND gate 86 (FIG. 1). This B clock pulse is applied to the AND gates 121 through 128. AND gates 121 through 128 also receive a count signal from the counter 76 (FIG. 1). Counts 1 through 8 are separately applied respectively to AND gates 121 through 128. The D clock signal is also applied to the digitizer along with the output from the set side of flip-flop 84 (FIG. 1). The set signal from flip-flop 84 enables AND gate 129 in FIG. 4 and AND gate 129 then passes the D clock pulses from the 50 kHz. clock 78. These D clock pulses passed by AND gate 129 enable the AND gates 131 through 138. The AND gates 131 through 138 also receive separate counts 1 through 8 from the counter 78. The separate counts 1 through 8 are applied respectively to AND gates 131 through 138.

The digitizer also receives a reset signal from the singleshot 74 (FIG. 1). This reset signal is passed by OR gates 141 through 148 to reset flip-flops 151 through 158. Accordingly, the flip-flops 151 through 158 and each address digitizer are reset at the beginning of the address indicate operation.

The output of the set side of the flip-flops 151 through 158 energize lines into the digital to analog (DA) converter 160. With no input into the DA converter 160, it has an output which represents an analog voltage at either the top or side of the area being scanned by the scanner 20 in FIG. 1. For simplicity of description we shall assume that the address digitizer shown in FIG. 4 is the vertical address digitizer 34 (FIG. 1). However, the horizontal address digitizer 36 (FIG. 1) and end of line address digitizer 38 (FIG. 1) take the same form. With this assumption, the output from the DA converter 160 would be a voltage specifying the top of the scan area for the cathode-ray tube 20. If the flip-flop 151 is energized, half of the voltage difference between the top of the scan area and the bottom of the scan area is added to the output of the DA converter bringing the DA converter output voltage to the vertical middle of the scan area. Flip-flop 152 if energized would cause the DA converter to add in one-fourth of the voltage from top to bottom in the scan area. Similarly, flip-flop 153 would cause the converter to add in one-eighth of the scan voltage from top to bottom in the scan area. Succeeding flip-flops add in smaller and smaller fractional increments until flip-flop 158, the last flip-flop, adds in a increment of 1/256 of the voltage from top to bottom in the scan area. As each of the flip-flops 151 through 158 is set, its output signal also turns on indicator lamps 161 through 168 respectively. The purpose of the indicator lamps is to show the operator the status of the flip-flops 151 through 158.

The voltage discriminator 170 receives the analog signal from the DA converter 160 and the vertical deflection signal from the deflection circuits. The voltage discriminator 170 has an output when the vertical deflection signal is below the signal from the DA converter 172 and passed back to AND gates 131 through 138. As previously pointed out, the digitizer in FIG. 4 could be a horizontal or end of line digitizer in which case the signal applied to the voltage discriminator would be the horizontal deflection signal instead of the vertical deflection signal.

A positive signal out of inverter 172 indicates the vertical deflection signal is above the voltage level out of the DA converter 160 (again assuming the digitizer in FIG. 4 is the vertical address digitizer 34). This positive signal from inverter 172 is passed back to AND gates 131 through 138. Accordingly, if one of these AND gates is also enabled by its associated count from counter 76 (FIG. 1), then the clock signal time D that AND gate will have an output which will reset its associated flip-flop from the group of flip-flops 151 through 158.

To summarize, the vertical digitizer operates as follows. During count 1 at clock signal time B flip-flop 151 is set. The DA converter 160 then has an output voltage level equivalent to the vertical middle of the scanning area. Voltage discriminator 170 detects whether the analog signal from the vertical potentiometer 44 is above or below the middle of the scanning area. If it is below, the voltage discriminator 170 has an output which is inverted by inverter 172. The output from inverter 172 is passed back to AND gate 131 which is enabled by count 1 and clock signal phase D. Since the output from inverter 172 is down or negative, the AND gate 131 does not have an output at pulse D time, and therefore flip-flop 151 is not reset. Thus, the DA converter will continue to have a voltage output level equivalent to the vertical middle of the scanning area.

During count 2 at clock signal time B the flip-flop 152 is set and the DA converter 160 has an output voltage level equivalent to a vertical position three-fourths of the vertical scanning distance, i.e., a position three-fourths below the top of the scanning area or one-fourth above the bottom of the scanning area. This voltage level is compared with the vertical address voltage from potentiometer 44. Assuming the vertical address voltage is above the voltage from the DA converter 160, the voltage discriminator 170 has no output and the inverter 172 has a positive output. The positive output from 172 will cause AND gate 132 to have an output signal when phase D during count 2 enables AND gate 132. The output from AND gate 132 will reset flip-flop 152. When the flip-flop 152 is reset, the output of the DA converter 160 reverts back to a voltage level at the middle of the vertical scanning distance.

The above procedure is repeated through the eight counts and thus for each of the eight flip-flops 151 through 158. The increment added in by the DA converter 160 for each flip-flop is successively smaller so that after all eight flip-flops have been tested, the output from the DA converter 160 will be a voltage very near the vertical address voltage, i.e.,within 1/256 of the vertical scanning distance in the scan area of cathode-ray tube 20.

The horizontal address digitizer and the end of line address digitizer operate in exactly the same manner except their voltage discriminator receives its input from the horizontal potentiometer 46 and the end of line potentiometer 48, respectively. All of the digitizers operate in parallel with respect to each other.

OPERATION

Figure 5:
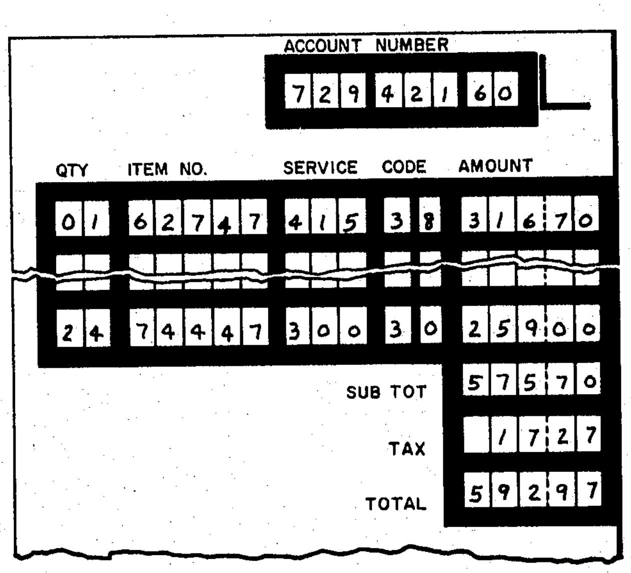
FIG. 5 is an example of a typical document to be scanned wherein the scanning requires exact addressing of the cathode-ray tube scanner.

In FIG. 5, a typical sales document is shown. To generate addresses for this document, an operator feeds the document into the character reader. The character reader initially is in an aging mode of operation and rapidly scans the whole document. As a result of this scanning, a facsimile of the document is displayed in display cathode-ray tube 42. The operator then adjusts the vertical and horizontal potentiometers 44 and 46 to bring the address mark to a position just to the right of the numeral 0 in the account number. IN addition, the operator adjusts the end of line potentiometer to position the end of line barrier just to the left of the numeral 7 in the account number. After this is accomplished the operator presses an address indicate key which actuates AND gate 70 (FIG. 1).

Figure 2:
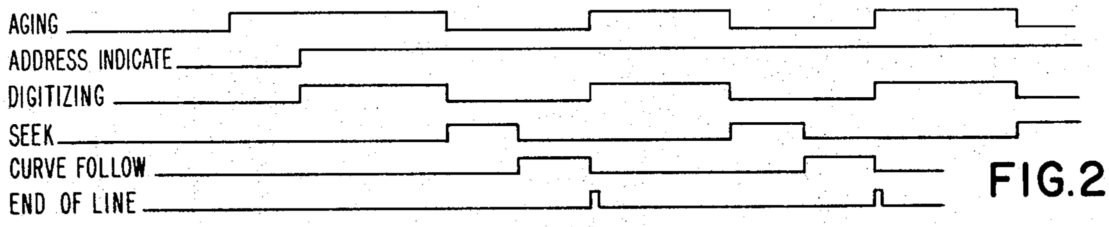
FIG. 2 is a timing diagram showing the time relationship between the format address indicate operation and the operation of the deflection circuits.

FIG. 2 shows the relative timing during the operation of the invention. Initially the aging mode of operation in the deflection circuits is active. After the operator has set the address mark and the end of line barrier in the potentiometers, he activates the address indicate key which brings up the address indicate signal. With the aging signal up and the address indicate signal up, the digitizing of the addresses in the potentiometers begins. Digitizing is completed at count 11 out of counter 76 which sets flip-flop 92. When flip-flop 92 is set, the seek operation begins.

The seek operation can vary in length of time and is dependent upon how long it takes the scanning beam to be addressed to the position specified by the address digitizers. When the seek operation is complete, the scanning beam is positioned to the point where the address mark was set by the potentiometers and the curve follow operation is initiated.

The curve follow operation continues until the end of line detection by the voltage discriminator 104. The end of line pulse from voltage discriminator 104 and singleshot 105 sets the deflection circuits back into the aging mode of operation. If the operator continues to hold down the address indicate key, the address indicate signal stays up and the digitizing, seek and curve follow series of operations are again repeated. The operator may wish to hold the key down so as to make fine adjustments in addressing.

Fine adjustments in addressing may be accomplished by observing the display cathode-ray tube 42 during the curve follow operation. During this curve follow operation, a larger display of the line of characters being addressed appears at the display cathode-ray tube 42. In other words, during curve follow the scanner is only scanning the line of characters in the account number rather than the whole document. Thus a blowup or larger picture is displayed in the cathode-ray tube 42. An observer may then observe where this curve follow operation is starting from by merely holding down the address indicate key. The starting position, of course, is the position of the observer has addressed in by adjusting the potentiometers 44 and 46. Accordingly, the observer can make fine adjustments by holding down the address indicate key and adjusting the potentiometers 44 and 46 to bring the start of the curve following operation closer to the first character to be recognized or read. Likewise the end of line barrier can be finely adjusted by observing where the curve follow operation terminates and then varying end of line potentiometer 48.

Once the operator has completed the fine adjustment, he may release the address indicate key and the deflection circuits will continue to operate in the aging mode. The operator may then read out the eight lamps in each of the address digitizers 34, 36 and 38. These lamps will be lit according to the digital address equivalent to the positions the operator has manually adjusted in the potentiometers 44, 46 and 48. The operator may then punch these addresses into cards and supply the cards to a computer which will then store the addresses for later usage in controlling the character reader.

The operator completes this operation for each line on the document shown in FIG. 5. In each case the operator would set the start of line and end of line address positions, read these out from the lamp indicators and pass the information to the computer. When it is desired to read a large file of documents of the same format, these documents are fed to the character reader. The computer contains the addresses associated with the scanning format for these documents. Thus, the computer can be programmed to control the scanner in the character reader to read all of the documents of the same format. Of course, if a new document of a different format is introduced, it must have its addresses digitized in the manner above described and then supplied to the computer for use in controlling the character reader.

It will be appreciated by one skilled in the art that many variations in hardware may be made without departing from the spirit and scope of the invention. The recognition mode and the scanning modes in the deflection circuits can be varied. The only necessity being that there be a display observable by the operator whereby he can adjust the addresses to be used by the scanner. The address indicate control signals could take on a variety of logical forms and likewise the address digitizers could be adapted in any number of ways to accomplish the conversion from analog to a digital signal and then back to a analog signal for use with the comparison of the signals from the potentiometers. While the invention has been particularly shown and described with reference to preferred embodiments thereof, it will be understood by those skilled in the art that various changes in form and details may be made therein without departing from the spirit and scope of the invention.

What we claim is:

1. In a character recognition machine including a flying spot scanner; means for operating said scanner in aging, character scan, and seek modes, the improvement comprising:

display means responsive to said means for operating said scanner for displaying a facsimile of a document being scanned by said flying spot scanner, manually adjustable means for applying address mark signals, means for applying said address mark signals to said display means whereby said display means displays a visual mark in relationship to said displayed document facsimile, means responsive to said scanner being operated in said aging mode for providing intensification signals to said display means as said flying spot scanner either intersects patterns on said document or is at the address position of the address mark signals, and means responsive to said scanner being operated in said seek mode for matching scanner deflection signals to said address mark signals.

2. Apparatus for developing field addresses for a document being scanned in a character recognition machine comprising:

manually adjustable means for providing vertical and horizontal address mark voltages, display means responsive to scanning signals to display a facsimile of said document being scanned, means for applying said address mark voltages to said display means whereby said display means is energized to display visual address marks in spatial relationship to said document facsimile, vertical and horizontal address digitizing means, means for selectively applying said address mark voltages to said digitizing means, and means for matching scanning signals to said address mark voltages.

3. The apparatus of claim 1 further comprising means for digitizing said address mark signals, and means for registering said digitized address mark signals.

4. The apparatus of claim 1 wherein said display means is a cathode-ray tube.

5. The apparatus of claim 1 wherein said manually adjustable means comprises vertical and horizontal potentiometers.

6. The apparatus of claim 1 further comprising means responsive to said scanner being operated in said character-scan mode for displaying the scanning path during character scanning so that a fine adjustment of said adjustable means will bring the initial scan point during said character-scan mode as close as possible to the character.

7. The apparatus of claim 6 further comprising means for reading out the scan address specified by the address mark signals from said adjustable means so that when the address mark is near a character the scan address of the character may be read.

8. The apparatus of claim 2 wherein said display means is a cathode-ray tube.

9. The apparatus of claim 2 wherein said manually adjustable means comprises vertical and horizontal potentiometers.